(12) United States Patent
Sudhakaran et al.

(10) Patent No.: US 11,074,160 B2
(45) Date of Patent: Jul. 27, 2021

(54) AUTOMATED TEST SCRIPT GENERATOR

(71) Applicant: INTERNATIONAL BUSINESS MACHINES CORPORATION, Armonk, NY (US)

(72) Inventors: Sajesh Sudhakaran, Bangalore (IN); Sivaraj Sethunamasivayam, Bangalore (IN); Gowtham Kuppusamy, Bangalore (IN); Priya Swamidass, Bangalore (IN); Greeshma Thottingal, Bangalore (IN); Sushmitha Rajendran, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/215,064

(22) Filed: Dec. 10, 2018

(65) Prior Publication Data

US 2020/0183813 A1 Jun. 11, 2020

(51) Int. Cl.
*G06F 11/36* (2006.01)
*G06F 40/30* (2020.01)

(52) U.S. Cl.
CPC ...... *G06F 11/3684* (2013.01); *G06F 11/3688* (2013.01); *G06F 40/30* (2020.01)

(58) Field of Classification Search
CPC ... G06F 11/3684; G06F 11/3688; G06F 40/30
See application file for complete search history.

(56) References Cited

U.S. PATENT DOCUMENTS

| | | |
|---|---|---|
| 5,335,342 A | 8/1994 | Pope et al. |
| 57,547,600 | 5/1998 | Warfield |
| 6,071,316 A | 6/2000 | Goossen et al. |
| 7,272,822 B1 | 9/2007 | Riggens et al. |
| 7,547,760 B2 | 6/2009 | Agazie et al. |
| 9,588,871 B1 | 3/2017 | Estes et al. |
| 2018/0210823 A1 | 7/2018 | Vorganti |
| 2018/0267887 A1* | 9/2018 | Dsouza ............... G06F 11/3684 |
| 2019/0005111 A1* | 1/2019 | Kilje ...................... G06F 16/81 |

FOREIGN PATENT DOCUMENTS

CN 107832229 3/2018

OTHER PUBLICATIONS

Youngkon Lee, EVEC: Event-Driven Test Script Methodology for SOA System, IEEE, 2011, retrieved on Nov. 9, 2020, pp. 110-115. Retrieved from the Internet: <URL: https://ieeexplore.IEEE.org/stamp/stamp.jsp?tp=&arnumber=6108409>. (Year: 2011).*

* cited by examiner

*Primary Examiner* — Hanh Thi-Minh Bui
(74) *Attorney, Agent, or Firm* — Richard A. Wilhelm

(57) ABSTRACT

A computer-implemented method, system and computer program product for automatically generating one or more test scripts for at least one software application based on one or more business documents, by: analyzing the business documents to identify one or more screens, including one or more fields on the screens, defined therein; and automatically generating the test scripts for the software application, wherein the test scripts are used to validate the screens, including the fields on the screens, as defined in the business documents.

9 Claims, 8 Drawing Sheets

XML FILE 120

```xml
<?xml version= "1.0" encoding= "UTF-8" ?>
<Page pageName= "">
    <Field name= "FirstName">
        <Type>String</Type>
        <Value></Value>
        <ValidationMsgs>
            <MessageCode>
                <Code></Code>
            </MessageCode>
        </ValidationMsgs>
    </Field>
    <Field name= "LastName">
        <Type>String</Type>
        <Value></Value>
        <ValidationMsgs>
            <MessageCode>
                <Code></Code>
            </MessageCode>
        </ValidationMsgs>
    </Field>
    <Field name= "DateofBirth">
        <Type>String</Type>
        <Value></Value>
        <ValidationMsgs>
            <MessageCode>
                <Code></Code>
            </MessageCode>
        </ValidationMsgs>
    </Field>
</Page>
```

FIG. 3

XML FILE 120

```xml
<?xml version= "1.0" encoding= "UTF-8" ?>
<Page pageName= "">
    <Field name= "FirstName">
        <Type>String</Type>
        <Value></Value>
        <ValidationMsgs>
            <MessageCode>
                <Code>MINLEN_8</Code>
            </MessageCode>
            <MessageCode>
                <Code>SPLCHAR</Code>
            </MessageCode>
        </ValidationMsgs>
    </Field>
    <Field name= "LastName">
        <Type>String</Type>
        <Value></Value>
        <ValidationMsgs>
            <MessageCode>
                <Code>MINLEN_8</Code>
            </MessageCode>
            <MessageCode>
                <Code>SPLCHAR</Code>
            </MessageCode>
        </ValidationMsgs>
    </Field>
    <Field name= "DateofBirth">
        <Type>String</Type>
        <Value></Value>
        <ValidationMsgs>
            <MessageCode>
                <Code>INVALID_DATE_FORMAT</Code>
            </MessageCode>
        </ValidationMsgs>
    </Field>
</Page>
```

FIG. 7

AUTOMATED TEST SCRIPT GENERATOR

BACKGROUND

Quality is the most important aspect in software application development. Test scripts are typically used to test the application's functionality against what is expected. However, creating test scripts usually involves a significant amount of manual effort.

Typically, a business team generates business documents for the software, such as business requirements, mock screens, etc. Thereafter, a quality assurance (QA) team creates test scripts for the software from the business documents.

Thus, there is a need in the art for a test script automation tools that can perform such functions. The present invention satisfies this need.

SUMMARY

The invention provided herein has a number of embodiments useful, for example, in implementing a computer-implemented method, system and computer program product for automatically generating one or more test scripts for at least one software application based on one or more business documents, by: analyzing the business documents to identify one or more screens, including one or more fields on the screens, defined therein; and automatically generating the test scripts for the software application, wherein the test scripts are used to validate the screens, including the fields on the screens, as defined in the business documents.

DRAWINGS

Referring now to the drawings in which like reference numbers represent corresponding parts throughout:

FIG. 3 is an example of an XML (eXtensible Markup Language) file, according to one embodiment.

FIG. 7 is an example of a normalized XML file, according to one embodiment.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention relates to a computer-implemented method and system for automatically generating one or more test scripts for at least one software application based on one or more business documents. Specifically, the present invention analyzes the business documents to identify one or more screens, including one or more fields on the screens, defined therein; and automatically generates the test scripts for the software application, wherein the test scripts are used to validate the screens, including the fields on the screens, as defined in the business documents.

System Description

Figure 1:
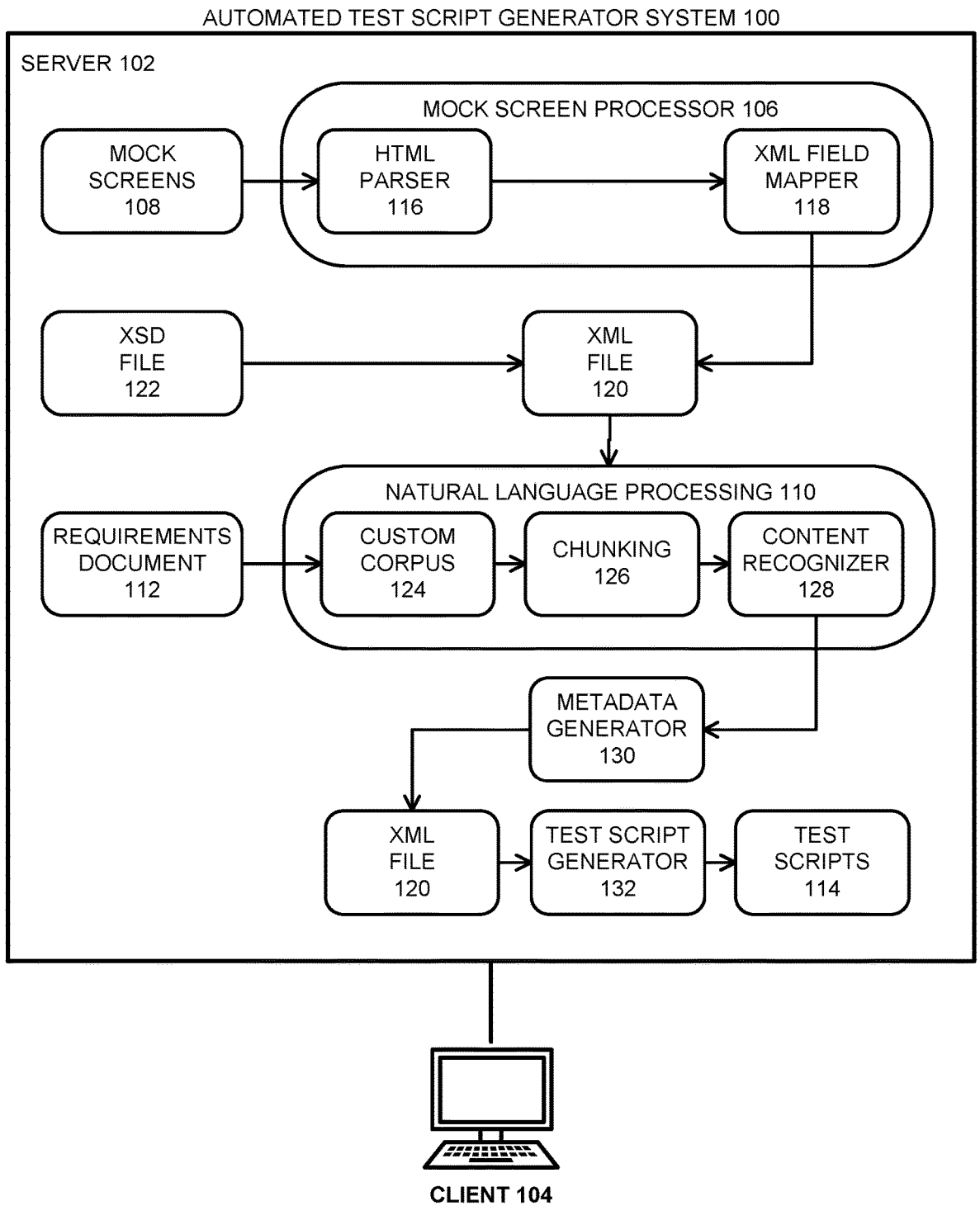
FIG. 1 illustrates an embodiment of a system for generating automated test scripts, according to one embodiment.

FIG. 1 illustrates an embodiment of a system 100 for generating automated test scripts, including one or more server computers 102 that process requests received from one or more client computers 104. Both the server computer 102 and client computer 100 are typically comprised of one or more processors, random access memory (RAM), read-only memory (ROM), and other components such data storage devices and data communications devices. Moreover, both the server computer 102 and client computer 104 execute one or more computer programs operating under the control of an operating system. These computer programs perform various functions as described in more detail below.

The system 100 includes a mock screen processor 106 to identify the fields depicted on one or more mock screens 108 (i.e., pages) and natural language processing 110 to identify textual descriptions in one or more requirements documents 112 concerning validation of the fields, in order to automatically generate test scripts 114.

The mock screen processor 106 includes an HTML (HyperText Markup Language) parser 116 and an XML (eXtensible Markup Language) field mapper 118. The mock screens 108 comprise part of the business documents generated by the business team.

The HTML parser 116 parses the HTML content of the mock screens 108 to identify the fields on the mock screens 108 for further processing. The mock screens 108 designed by the business team as a preliminary version of the actual screens, and typically are comprised of computer-generated HTML, when may be automatically rendered by any number of tools. The HTML of the mock screens 108 represents the structure of the screens and their fields.

The HTML of the mock screens 108 can be parsed with features available in JavaScript™. The parsing involves extraction of every field and its associated information from the mock screen 108, wherein each field is identified by a field name, type, default value (if any), and a validation message.

The information concerning the mock screens 108 and the fields on the mock screens 108 are stored into an XML file 120 by the XML field mapper 118. The XML field mapper 118 uses an XSD (XML Schema Definition) 122 and XSLT (eXtensible Stylesheet Language Transformations), to create the XML file 120.

Figure 2:
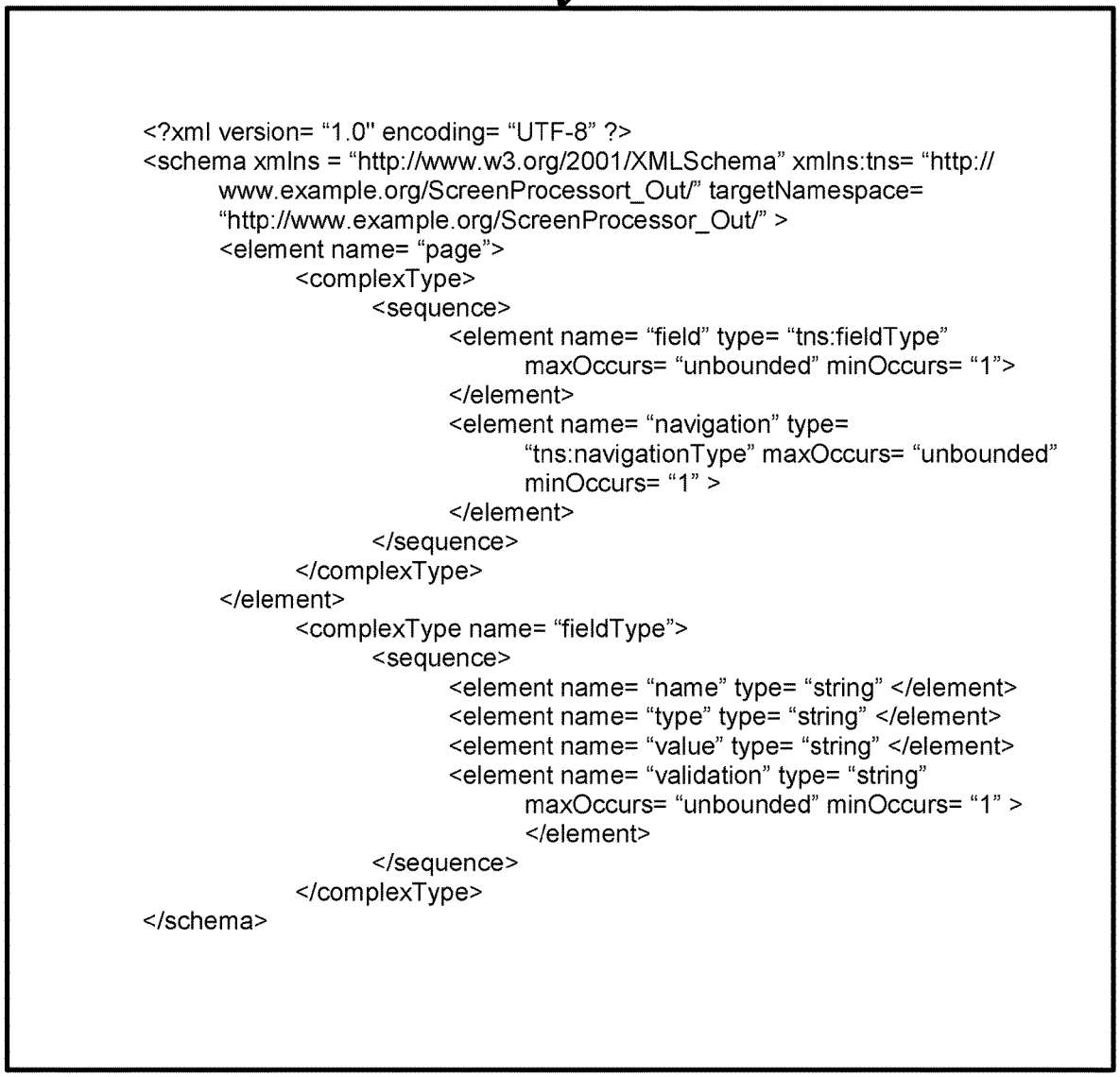
FIG. 2 is an example of an XSD (XML Schema Definition) file, according to one embodiment.

FIG. 2 is an example of the XSD 122. The XSD 122 includes definitions for each mock screen 108 (i.e., page), field name, type, default value, and validation message.

In one embodiment, a separate XML file 120 is generated for each mock screen 108. However, other embodiments may generate a single XML file 120 for all mock screens 108, or multiple XML files 120 for all mock screens 108, or multiple XML files 120 for each mock screen 108.

FIG. 3 is an example of the XML file 120. The XML file 120 contains definitions for each mock screen 108 (i.e., page), including field name, type, default value, and validation message.

The XML file 120 is further normalized by natural language processing 110 of one or more requirements documents 112. Like the mock screens 108, the requirements documents 112 comprise part of the business documents generated by the business team.

The natural language processing 110 is used to identify textual descriptions in one or more requirements documents 112 that relate to the fields on the mock screens 108. Specifically, the natural language processing 110 determines one or more validation messages for the fields of the mock screens 108 from the requirements documents 112.

To interpret the requirements documents 112 usually takes considerable human effort. The natural language processing 110 helps to reduce the human effort involved. The natural language processing 112 performs the pivotal role of identifying and mapping the requirements documents 112 to the mock screens 108. This is done by deriving textual information of the requirements documents 112 and then mapping the textual information to the mock screens 108 represented by the XML file 120.

The natural language processing 110 uses a natural language toolkit (NLTK) to process the textual information of the requirements documents 112 to extract validations for the fields for the mock screens 108. The NLTK is a suite of libraries and programs for symbolic and statistical natural language processing 110 for English language text.

The various components of the natural language processing 110 of the requirements documents 112 include the following:
  custom corpus 124,
  chunking 126, and
  context recognizer 128.
These are described in more detail below.

Custom Corpus

The NLTK used by the natural language processing 110 usually comes with a diverse set of corpora, such as WordNet™, Named Entity Chunker™, Frame Net Chunked Corpora™, etc. Here, the requirements documents 112 are used to create the custom corpus 124 for further natural language processing 110 of the textual information therein. The NLTK provides a built-in corpus reader support, which allows it to be customized. Having the right set of corpora is very vital in improving the performance of the natural language processing 112.

The requirements documents 112 are input to the custom corpus 124 so that the natural language processing 110 using the NLTK can perform semantic, lexical and further analysis on the corpus 124 to extract validations for the fields for the mock screens 108. Specifically, the NLTK is used by the natural language processing 110 to linguistically analyze the custom corpus 124.

Chunking

Figure 4:
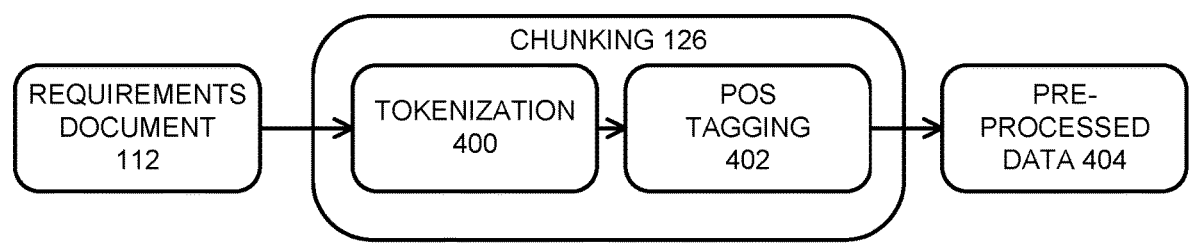
FIG. 4 illustrates the components used in chunking, according to one embodiment.

Chunking 126 is form of pre-processing of the requirements documents 112, where the textual information therein is broken down to smaller chunks for further analysis and derivation. FIG. 4 further illustrates the components of chunking 126, which includes tokenization 400, POS (Part-Of-Speech) tagging 402, and the creation of pre-processed data 402.

Tokenization

Tokenization 400 is a process of segmenting paragraphs from the textual information in the requirements documents 112 into smaller tokens of sentences, which are further segmented into words for context analysis.

POS Tagging

POS tagging 402 tags the words from tokenization 400 using POS tags, such as nouns, verbs, adjectives, etc. The POS tags identify entities (i.e., words) and their relations, in order to extract meaning from the entities and their relations. For example, a sentence is split into words by the tokenization 400, and each word is tagged with its part-of-speech by the POS tagging. Tenses present in the sentence are also tagged.

A table of POS tags with their meanings are set forth below:

| POS Tag | Meaning |
| --- | --- |
| CC | Coordinating conjunction |
| CD | Cardinal digit |
| DT | Determiner |
| EX | Existential there (e.g. there is) |
| FW | Foreign word |
| IN | Preposition/subordinating conjunction |
| JJ | Adjective |
| JJR | Adjective comparative |
| JJS | Adjective superlative |
| LS | List marker |
| MD | Modal verbs |
| NN | Noun, singular |
| NNS | Plural noun |
| NNP | Proper noun singular |
| NNPS | Proper noun plural |
| PDT | Predeterminer |
| POS | Possessive noun |
| PRP | Personal pronoun |
| PRPS | Possessive pronoun |
| RB | Adverb |
| RBR | Adverb, comparative |
| RBS | Adverb, superlative |
| TO | To |
| UH | Interjection |
| VB | Verb |
| VBD | Verb, past tense |
| VBG | Verb, gerund |
| VBN | Verb, past participle |
| VBP | Verb, singular present |
| VBZ | Verb, singular present |
| WDT | WH-determiner |
| WP | WH - Pronoun |
| WPS | Possessive pronoun |

The words or entities are grouped to create entity relationships. Excess words are removed by the process of chinking, which is described in more detail below. Specifically, the words in a sentence are tokenized 400 and each word is tagged by the POS tagging 402 with a POS, and then the words are grouped to determine their relationships, and output as pre-processed data 404.

Each discrete component in the requirements document 112 is represented as nouns, and referred to with pronouns and adjectives to describe them further. Hence, the requirements documents 112 act as a custom corpus 124, which is imported for pre-processing, which means that it is tokenized and tagged to create entity relationships.

Figure 5:
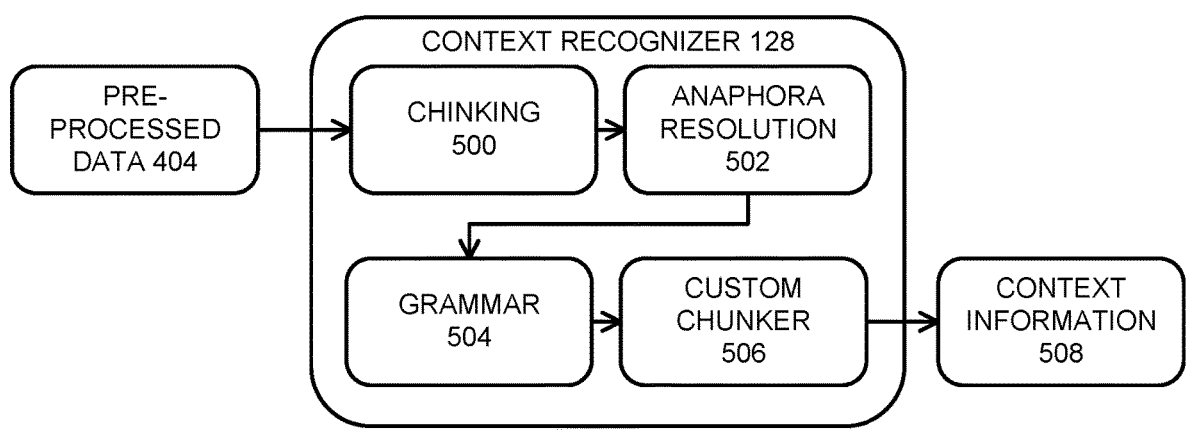
FIG. 5 illustrates the components used in a context recognizer, according to one embodiment.

Context Recognizer:

The context recognizer 128 uses the pre-processed data 404, comprised of words or entities and their relationships, generated from chunking 126. The context recognizer 128 then processes the pre-processed data 404, The processing of the textual information is always a challenge, and FIG. 5 illustrates the components of the context recognizer 128 that perform these functions, which include chinking 500, anaphora resolution 502, grammar 504, and custom chunker 506, which results in the creation of context information 508.

Chinking

Figure 6:
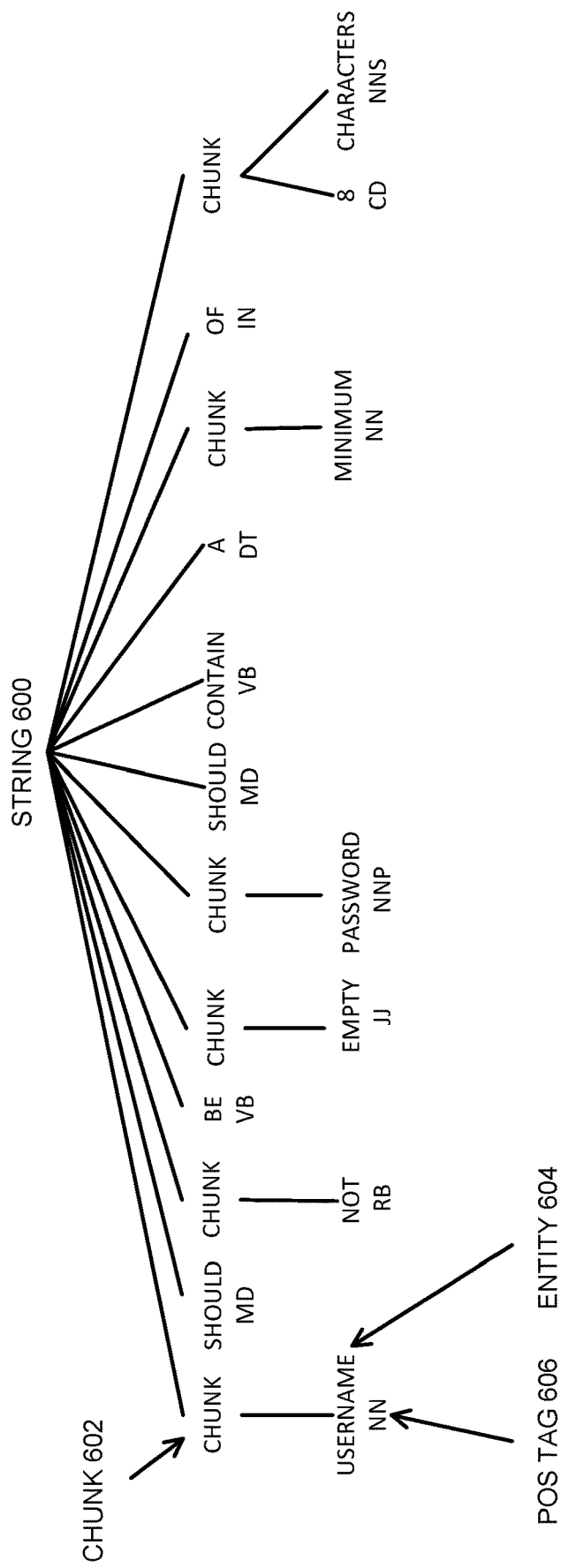
FIG. 6 illustrates the chinking of a string, according to one embodiment.

Chinking 500 is like chunking 126, but removes the words that should not be grouped. For example, FIG. 6 illustrates the chinking of the string 600 comprised of "Username should not be empty. Password should contain a minimum of 8 characters".

The string 600 has been tokenized 400 into words, and tagged 402 with POS tags, resulting in chunks 602. Each of the chunks 600 includes an entity (i.e., word) 604 and its POS tag 606. Chinking 500 removes the entities (i.e., words) that should not be grouped, i.e., those not labeled as chunks 602.

Anaphora Resolution

Anaphora resolution 502 comprises pronoun resolution, which resolves references to other items in the pre-processed data 404. These other items are usually nouns, but can also be verb phrases, whole sentences or paragraphs.

As noted above, the requirements documents 112 define the fields in the mock screens 108, and may subsequently use pronouns to refer these fields. The anaphora resolution 502 is used to determine which subject is included in the context.

For example, as noted above, the requirements documents 112 may include a string that states "a username must not contain a password and should not contain special characters." The anaphora resolution 502 determines the correct subject from this statement.

Grammar

The grammar 504 provides the correct grammar from the requirements documents 112. Specifically, the grammar 504 processes the requirements documents 112 such that the subject is the key and the predicate is the value. For example, the predicate may be the validation to be performed and the subject is the field name against which the validation is performed.

Custom Chunker

The custom chunker 506 handles aspects of sentences not represented by POS tags. For example, sometimes POS tags are insufficient to determine how a sentence should be chunked.

For example, consider the following two sentences, where the words have been chunked and POS tagged:
  a. Joey/NN sold/VBD the/DT farmer/NN rice/NN ./.
  b. Nick/NN broke/VBD my/DT computer/NN monitor/NN ./.

These two sentences have the same POS tags, yet they are chunked differently. In the first sentence, the farmer and rice are separate chunks, while the corresponding material in the second sentence, the computer monitor, is a single chunk.

The custom chunker 506 makes use of information about the content of the words, in addition to their POS tags, to maximize chunking performance.

Metadata Generator

A metadata generator 130 uses the context information 508 from the context recognizer 128 to generate metadata for the fields on the mock screens 108, wherein the metadata for the fields on the mock screens includes at least a field name, type, a default value, and a validation message. Specifically, the context information 508 extracted from the natural language processing 110 is manipulated to identify validation messages for the fields of the mock screens 108.

The metadata generator 130 maintains a set of predefined validation criteria, comprising standard or the most common validations in a key-value pattern storing a code denoting each validation message. These validation message codes are fetched and mapped to the corresponding fields of the XML file 120.

Normalized XML File 120

After the completion of the natural language processing 110, the XML file 120 has been normalized, as shown in FIG. 7.

The normalized XML file 120 includes the following fields:
  Field Name,
  Type,
  Value (default), and
  Validation Messages (Msgs) and their associated Message Codes.

For example, as shown in FIG. 7, the Validation Messages for the "First Name" field may include a Message Code for "MINLEN_8", which signifies a minimum length of 8 characters for the field, and a Message Code for "SPL-CHAR", which signifies that special characters are permitted in the field.

The normalized XML file 120 output from the metadata generator 130 is then used for generating the test scripts 114.

Test Script Generator

The test scripts 114 for the software application are automatically generated by a test script generator 132 that generates random values for the fields on the mock screens 108.

The test script generator 132 converts the normalized XML file 120 to one or more DOM (Document Object Model) objects, wherein DOM is a cross-platform and language-independent application programming interface (API) that treats the normalized XML file 120 as a tree structure, wherein each node of the tree structure is an object representing a part of the normalized XML file 120.

The test script generator 132 parses the DOM object to check for field names and types. Based on the field type, random values for both positive and negative scenarios are generated for use by the test scripts 114.

Figure 8:
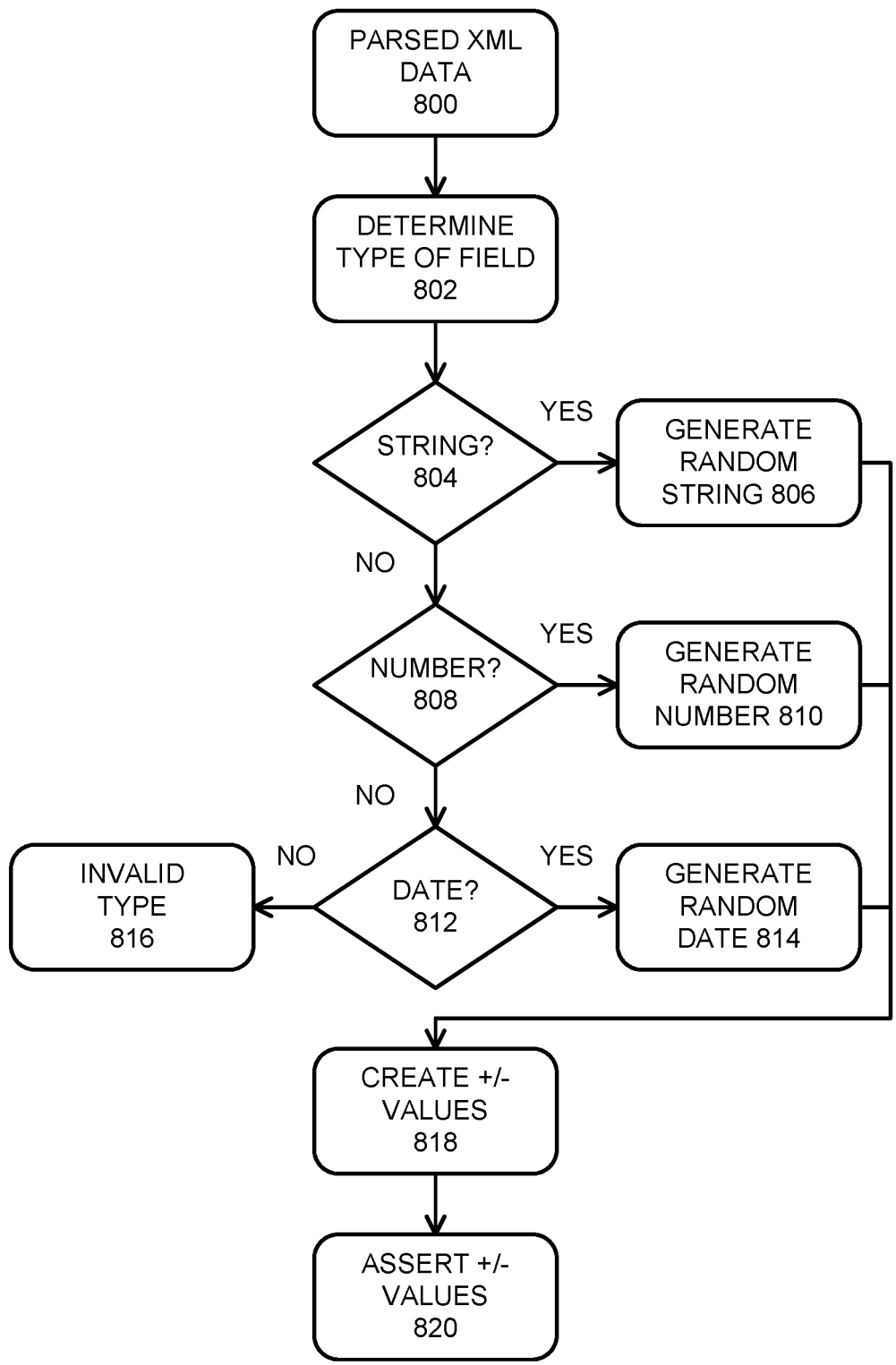
FIG. 8 illustrates the steps and functions performed by a test script generator, according to one embodiment.

FIG. 8 further illustrates these steps and functions performed by the test script generator 132.

Block 800 represents the parsed DOM objects from the normalized XML file 120.

Block 802 represents determining the type of the field.

Block 804 is a decision block that determines whether the type is "string." If so, block 806 generates a random string.

Block 808 is a decision block that determines whether the type is "number." If so, block 810 generates a random number.

Block 812 is a decision block that determines whether the type is "date." If so, block 814 generates a random date.

Otherwise, block 816 indicates an error occurred, due to an invalid type.

Block 818 represents both positive and negative values being created for the field.

Block 820 represents both positive and negative values being asserted for the field.

Statutory Subject Matter

It can be seen that the present invention provides a number of benefits and advantages. These benefits and advantages include improvements to the technology or technical field of software development, and more specifically, for improving the QA of a software application by automatically generating test scripts for the software application based on business documents for the software application.

For example, the present invention provides the following benefits and advantages to the technical field:
  Automatically generates test scripts for software applications based on the business documents, such as business requirements and mock screens.
  The QA team can focus on more complex testing scenarios rather than testing screens, fields and validations.

Reduces manual efforts in finding most screens, fields and validations.

Reduces project costs.

Increases project quality.

The benefits and advantages of the present invention also include improvements to the functioning of the devices themselves, including the computers used in the development of the software application, as well as the computers that execute the software application, as compared to prior computer-implemented methods and systems for improving software development.

The present invention also include improvements to the computers used in the testing of software applications. Specifically, computers running a testing framework software, such as the Selenium™ testing framework software, require test scripts to work. In an embodiment, a test script generated according to the present disclosure is used to configure a testing framework. A testing framework configured with a test script according to the present invention may be able to test a particular software application in a faster and more accurate manner than known testing frameworks using manually developed test scripts. In addition to being time consuming to develop, manually developed test scripts may be incomplete or contain errors.

The benefits and advantages of the present invention are applied to a particular machine, namely, the computers used in the development of the software application, as well as the computers that execute the software application. Using the present invention, these computers can benefit from the capabilities of automatically generating test scripts for software applications.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Conclusion

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   automatically generating one or more test scripts for at least one software application based on one or more business documents, wherein the one or more business documents include one or more mock screens, and a requirements documents, by:
   identifying fields depicted on the one or more mock screens using a parser;
   identifying textual descriptions in the requirements documents that relate to the fields on the mock screens using natural language processing, wherein the requirements document includes paragraphs and sentences, and
   wherein the natural language processing determines one or more validation messages for the fields on the mock screens from the requirements documents;
   generating metadata for the fields on the mock screens using context information extracted from the natural language processing, wherein the metadata for the fields on the mock screens includes at least a field name, type, a default value, and a validation message; and
   automatically generating the test scripts for the software application, wherein the test scripts are used to validate screens of a software application, including the fields on the screens, as defined in the business documents.

2. The method of claim 1, further comprising testing the software application using the test scripts.

3. The method of claim 1, wherein information concerning the screens and the fields on the screens are stored into a file.

4. The method of claim 1, wherein automatically generating the test scripts for the software application from the analyzed business documents comprises a test script generator that generates random values for the fields on the screens.

5. A computer-implemented system, comprising:
   one or more computers programmed for automatically generating one or more test scripts for at least one software application based on one or more business documents, wherein the one or more business documents include one or more mock screens, and a requirements documents, by:
   identifying fields depicted on the one or more mock screens using a parser;
   identifying textual descriptions in the requirements documents that relate to the fields on the mock screens using natural language processing, wherein the requirements document includes paragraphs and sentences, and
   wherein the natural language processing determines one or more validation messages for the fields on the mock screens from the requirements documents;
   generating metadata for the fields on the mock screens using context information extracted from the natural language processing, wherein the metadata for the fields on the mock screens includes at least a field name, type, a default value, and a validation message; and
   automatically generating the test scripts for the software application, wherein the test scripts are used to validate screens of a software application, including the fields on the screens, as defined in the business documents.

6. The system of claim 5, further comprising testing the software application using the test scripts.

7. The system of claim 5, wherein information concerning the screens and the fields on the screens are stored into a file.

8. The system of claim 5, wherein automatically generating the test scripts for the software application from the analyzed business documents comprises a test script generator that generates random values for the fields on the screens.

9. A computer program product, the computer program product comprising a computer readable storage medium having program instructions embodied therewith, the program instructions executable by one or more computers to cause the computers to perform a method comprising:
   automatically generating one or more test scripts for at least one software application based on one or more business documents, wherein the one or more business documents include one or more mock screens, and a requirements documents, by:
   identifying fields depicted on the one or more mock screens using a parser;

identifying textual descriptions in the requirements documents that relate to the fields on the mock screens using natural language processing, wherein the requirements document includes paragraphs and sentences, and
wherein the natural language processing determines one or more validation messages for the mock fields on the screens from the requirements documents;
generating metadata for the fields on the mock screens using context information extracted from the natural language processing, wherein the metadata for the fields on the mock screens includes at least a field name, type, a default value, and a validation message;
automatically generating the test scripts for the software application, wherein the test scripts are used to validate screens of a software application, including the fields on the screens, as defined in the business documents.

\* \* \* \* \*